(12) United States Patent
Hu

(10) Patent No.: US 12,215,868 B2
(45) Date of Patent: Feb. 4, 2025

(54) INJECTOR WITH DISC FOR HYDROGEN-DRIVEN GAS TURBINE ENGINE

(71) Applicant: PRATT & WHITNEY CANADA CORP., Longueuil (CA)

(72) Inventor: Tin Cheung John Hu, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/423,649

(22) Filed: Jan. 26, 2024

(65) Prior Publication Data

US 2024/0263583 A1 Aug. 8, 2024

Related U.S. Application Data

(60) Provisional application No. 63/482,813, filed on Feb. 2, 2023.

(51) Int. Cl.
*F23R 3/28* (2006.01)
*F02C 7/22* (2006.01)

(52) U.S. Cl.
CPC ............... *F23R 3/286* (2013.01); *F02C 7/22* (2013.01)

(58) Field of Classification Search
CPC .. F23R 3/28; F23R 3/283; F23R 3/286; F23R 3/34; F23R 3/343; F23R 3/346; F23R 3/36
See application file for complete search history.

(56) References Cited

U.S. PATENT DOCUMENTS

| | | | |
|---|---|---|---|
| 3,906,718 A * | 9/1975 | Wood | F23R 3/12 60/738 |
| 3,961,475 A * | 6/1976 | Wood | F23R 3/12 431/177 |
| 4,107,918 A | 8/1978 | Andrew et al. | |

(Continued)

FOREIGN PATENT DOCUMENTS

| | | |
|---|---|---|
| DE | 2116295 | 10/1972 |
| DE | 7534621 | 7/1976 |

OTHER PUBLICATIONS

European Search Report for European Patent Application No. 24154277.8 mailed May 16, 2024.

*Primary Examiner* — William H Rodriguez
(74) *Attorney, Agent, or Firm* — Carlson, Gaskey & Olds, P.C.

(57) ABSTRACT

An injector for a gas turbine engine includes an annular gas nozzle, a hydrogen feed conduit, and a disc. The annular gas nozzle is disposed along a central nozzle axis and includes a forward face, a frustoconical interior surface, and gas feed conduits that open at the frustoconical interior surface. The hydrogen feed conduit extends along the central nozzle axis through the annular gas nozzle. The hydrogen feed conduit and the frustoconical interior surface define there between an annular mixing chamber. The hydrogen feed conduit has an end portion that is axially displaced from the forward face. The end portion includes feed holes that open into the mixing chamber. The disc is disposed on the end portion and is diametrically larger than the end portion so as to form a forward boundary of the annular mixing chamber. The disc may have multiple teeth, serrated edges, single or multiple bleed holes that are normal or angularly drilled to enhance fuel and air mixing, and improve flame stability.

16 Claims, 3 Drawing Sheets

(56) References Cited

U.S. PATENT DOCUMENTS

| | | | | |
|---|---|---|---|---|
| 4,327,547 A | * | 5/1982 | Hughes | F23D 17/002 |
| | | | | 60/39.463 |
| 4,337,618 A | * | 7/1982 | Hughes | F23L 7/002 |
| | | | | 60/742 |
| 4,342,198 A | * | 8/1982 | Willis | F23D 17/002 |
| | | | | 60/737 |
| 4,463,568 A | | 8/1984 | Willis et al. | |
| 4,893,475 A | * | 1/1990 | Willis | F23R 3/28 |
| | | | | 60/743 |
| 5,121,608 A | * | 6/1992 | Willis | F23D 11/36 |
| | | | | 60/737 |
| 5,319,936 A | | 6/1994 | Ikeda et al. | |
| 5,660,045 A | | 8/1997 | Ito et al. | |
| 11,175,045 B2 | * | 11/2021 | Benjamin | F23R 3/28 |
| 11,920,793 B1 | * | 3/2024 | Strzepek | F23R 3/286 |
| 2010/0050648 A1 | | 3/2010 | Miura et al. | |
| 2010/0300102 A1 | | 12/2010 | Bathina et al. | |
| 2017/0299190 A1 | * | 10/2017 | Patel | F02C 7/22 |
| 2018/0128490 A1 | * | 5/2018 | Boardman | F23R 3/283 |
| 2019/0024899 A1 | * | 1/2019 | Patel | F23R 3/346 |
| 2019/0032559 A1 | * | 1/2019 | Dai | F23R 3/286 |
| 2019/0203929 A1 | * | 7/2019 | Benjamin | F23R 3/286 |
| 2022/0268213 A1 | * | 8/2022 | Morenko | F23R 3/12 |
| 2022/0356845 A1 | | 11/2022 | Morenko et al. | |

* cited by examiner

INJECTOR WITH DISC FOR HYDROGEN-DRIVEN GAS TURBINE ENGINE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Present gas turbine engines use liquid hydrocarbon fuels (LHF). LHF is provided through a fuel supply system and introduced into the combustor by liquid injectors. The fuel supply system and liquid injectors are designed for handling and efficient burning of the LHF. For instance, as liquid is much denser than the air (gas) it is to be mixed with, it is necessary for the liquid injectors to atomize the LHF into tiny droplets in order to facilitate more uniform burning. More recently it has been proposed to utilize gaseous fuel, such as hydrogen ($H_2$), as an aviation fuel.

SUMMARY

An injector for a gas turbine engine according to an example of the present disclosure includes an annular gas nozzle that is disposed along a central nozzle axis and includes a forward face, a frustoconical interior surface, and gas feed conduits that open at the frustoconical interior surface. A hydrogen feed conduit extends along the central nozzle axis through the annular gas nozzle. The hydrogen feed conduit and the frustoconical interior surface define there between an annular mixing chamber. The hydrogen feed conduit has an end portion that is axially displaced from the forward face. The end portion includes feed holes that open into the mixing chamber. A disc is disposed on the end portion of the hydrogen feed conduit and is diametrically larger than the end portion of the hydrogen feed conduit.

A gas turbine engine according to an example of the present disclosure includes a combustor section that has a combustion chamber, a hydrogen source, and an injector as in any of the foregoing embodiments, for introducing hydrogen from the hydrogen source and gas into the combustion chamber.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
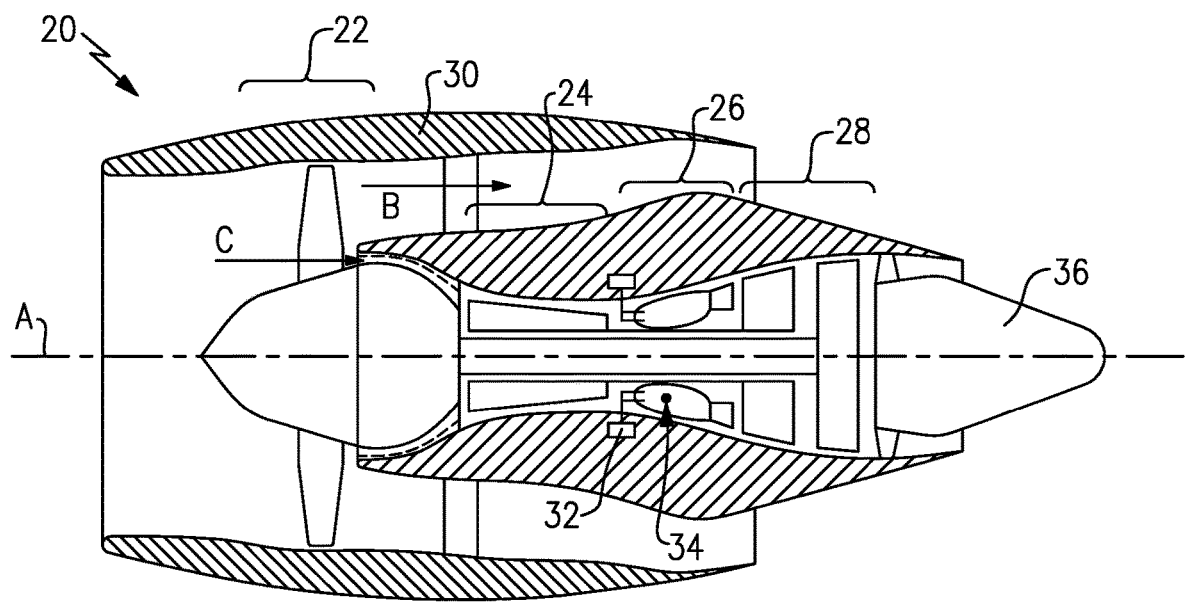
FIG. 1 illustrates a gas turbine engine.

FIG. 1 schematically illustrates a gas turbine engine 20. The example gas turbine engine 20 is a turbofan that generally incorporates a fan section 22, a compressor section 24, a combustor section 26, and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air or other combustion gas is mixed with fuel from a fuel system 32 and ignited by igniter 34 to generate an exhaust gas flow that expands through the turbine section 28 and is exhausted through exhaust nozzle 36. The fan section 22 is at the front of the engine 20 and the exhaust nozzle 36 is at the back of the engine 20, such that as used herein "forward" refers to an orientation toward the front and "aft" refers to an orientation toward the back. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller.

While present gas turbine engines use liquid hydrocarbon fuels (LHF), the engine 20 of the present disclosure is designed to use gaseous fuel, such as hydrogen, in the fuel system 32. In this regard, the fuel system 32 may carry liquid cryogenic hydrogen or gaseous hydrogen, both of which are provided to the combustor section 26 as gaseous hydrogen. A challenge to using hydrogen is that because it is a gas, its handling and combustion properties differ from that of LHF. For instance, hydrogen does not require atomization like a liquid, and hydrogen has higher flammability and different flame characteristics than LHF. Accordingly, injector nozzles that are designed for hydrogen are needed. In these regards, the engine 20 includes one or more injectors 38 for introducing the hydrogen fuel into the combustor section 26.

Figure 2:
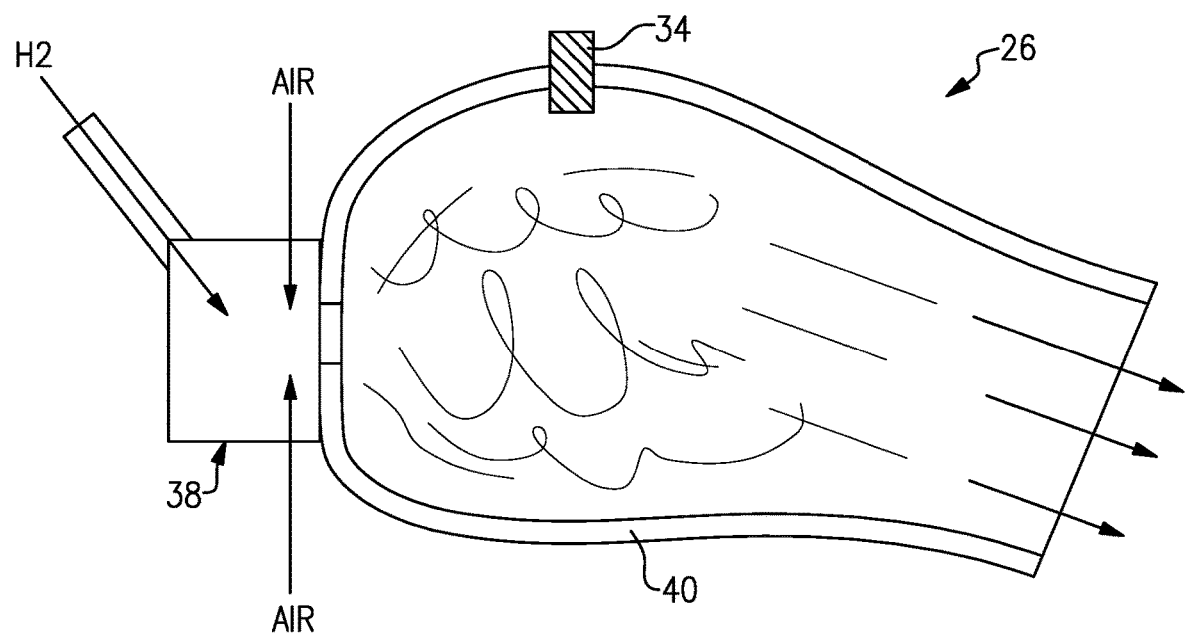
FIG. 2 illustrates a combustor chamber and injector of the engine.
Figure 3:
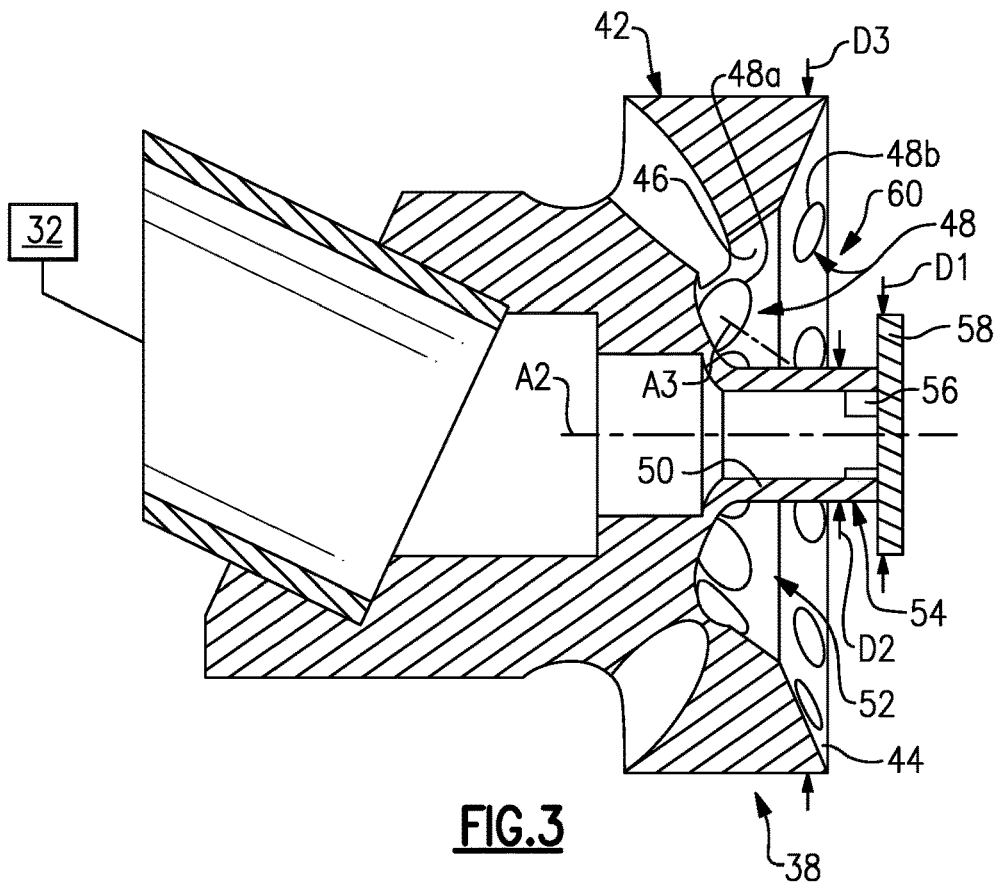
FIG. 3 illustrates a sectioned view of an example injector.
Figure 4:
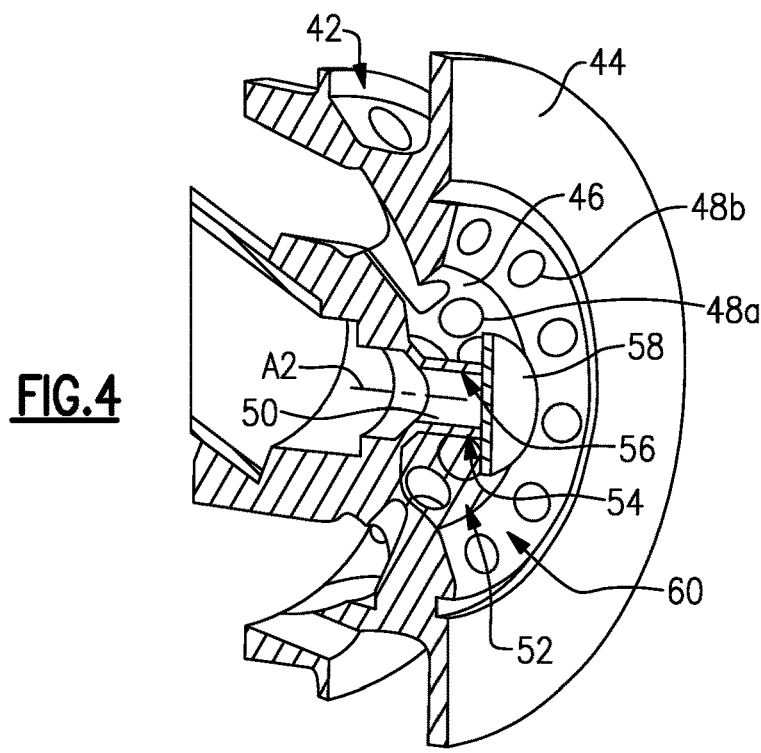
FIG. 4 illustrates a sectioned, perspective view of the injector of FIG. 3.

As shown in FIG. 2, the injector 38 is arranged on a combustion chamber 40 of the combustor section 26 for introducing hydrogen and gas (e.g., air in the examples herein). FIG. 3 illustrates an isolated, sectioned view of an example of the injector 38, and FIG. 4 illustrates a perspective, sectioned view of the injector 38 (both views are sectioned in a plane through central axis A2 of the injector 38). The injector 38 includes an annular gas nozzle 42 disposed along the central nozzle axis A2. The annular gas nozzle 42 includes a forward face 44, a frustoconical interior surface 46 recessed from the forward face 44, and gas feed conduits 48 that open at the frustoconical interior surface 46. In the illustrated example, the gas feed conduits 48 include inner gas feed conduits 48a and outer gas feed conduits 48b.

The gas feed conduits 48a/48b are obliquely sloped with respect to the central nozzle axis A2. In the illustrated example, the inner gas feed conduits 48a are sloped at a first angle, and the outer gas feed conduits 48b are sloped at a second, shallower angle. The annular gas nozzle 42 is connected to an air source, such as the compressor section 24. A "conduit" as used herein is defined by one or more structures that together convey a fluid from one point to another. For example, a conduit conveying fluid from point A to point B may include one of, or a combination of: a tube, an aperture defined through a part of an engine, a filter, a pump, and so on, depending on the application and context as would be understood by a person of ordinary skill in the art reading the present disclosure.

The injector 38 further includes a hydrogen feed conduit 50 that extends along the central nozzle axis A2 through the annular gas nozzle 42. The hydrogen feed conduit 50 is connected to the fuel system 32 (hydrogen source) for providing hydrogen to be mixed with the air for combustion. The hydrogen feed conduit 50 and the frustoconical interior surface 46 define there between an annular mixing chamber 52. The hydrogen feed conduit 50 has an end portion 54 that that is axially displaced to be forward of the forward face 44 of the annular air nozzle 42. The end portion 54 includes feed holes 56 that open into the mixing chamber 52. The gas feed conduits 48a/48b provide two stages of air to mix with the radially outwardly flowing hydrogen. For example, flow from the inner gas feed conduits 48a intersects the flow from the feed holes 56, to rapidly mix air and hydrogen. The flow from the outer gas feed conduits 48b at the shallower angle serves to control the amount of flow from the injector 38, as well as the cone angle.

There is a disc 58 disposed on the end portion 54 of the hydrogen feed conduit 50. The disc 58 is a circular plate that has forward and aft sides that are substantially flat. It is attached on its aft side to the tip of the hydrogen feed conduit 50. The disc 58 has a diameter D1, the hydrogen feed conduit 50 has a diameter D2, and the annular air nozzle 42 has a diameter D3. The disc 58 is diametrically larger than the end portion 54 of the hydrogen feed conduit 50. This enlarged size of the disc 58 forms a forward boundary of the annular mixing chamber 52. As an example, the disc 58 is diametrically larger than the end portion 54 by a factor of 1.2 to 2.5 (i.e. the ratio of D1/D2). With respect to the annular air nozzle 42, the nozzle 42 is diametrically larger than the disc 58 by a factor of 2.0 to 4.0

During operation of the engine 20, air is provided through the gas feed conduits 48, which are obliquely sloped with respect to the central nozzle axis A2 such that the gas feed conduits 48 point at the hydrogen feed conduit 50 axially aft of the feed holes 56. For instance, the central axes A3 of the air feed conduits 48 intersect the hydrogen feed conduit 50 aft of the feed holes 56. As a result, the air jetted from the gas feed conduits 48a impinges the outer surface of the hydrogen feed conduit 50, thereby causing the air to circulate in the mixing chamber 52. The gas feed conduits 48b, which have a different angle of incidence relative to the disc 58, are pointed radially outwardly of the disc 58. For instance, the central axes A3 of the air feed conduits 48b do not intersect the disc 58. As a result, the air jetted from the gas feed conduits 48b flows across the mixing chamber 52 and carries mixed air and hydrogen and out of the injector 38 into the combustion chamber 40. The aft side of the disc 58 provides a forward bound of the mixing chamber 52, which facilitates containment of the air in the mixing chamber for enhanced flow circulation. The circulating air exits the mixing chamber 52 through a discharge region 60 radially between the disc 58 and the annular air nozzle 42. The feed holes 56 are pointed toward the discharge region 60 such that the exiting air entrains the hydrogen that streams from the feed holes 56, thereby mixing with the hydrogen and carrying it into the combustion chamber 40 for ignition.

Figure 5:
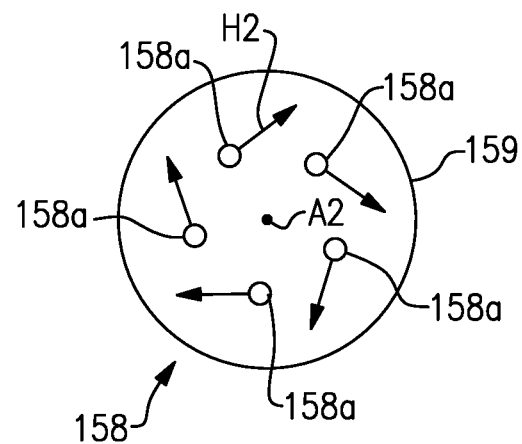
FIG. 5 illustrates another example disc that has hydrogen bleed holes.

FIG. 5 illustrates another example disc 158. The disc 158 has the same outer diameter as the disc 58 except that it includes hydrogen bleed holes 158a that extend through the thicker disc 158. The hydrogen bleed holes 158a are arranged circumferentially around the disc 158 at uniform intervals and are located radially intermediate the axis A2 and the radially outer edge 159 of the disc 158. The hydrogen bleed holes 158a may be oriented, with respect to central holes axes, parallel to the axis A2 or angled to axis A2. For example, the hydrogen bleed holes 158a are radially and tangentially sloped to induce a swirling flow of bleed hydrogen. The hydrogen bleed holes 158a allow small amount of hydrogen through the disc 158 to facilitate flame stabilization near low fuel flow and lean blow out conditions. In this regard, the number of hydrogen bleed holes 158a and radial location may be varied to tailor performance.

The term "tangential slope" (or variations thereof) refers to an orientation (component) that (a) forms an oblique angle with the axis A2 and (b) lies in a plane that is (i) non-intersecting with the axis A2 and (ii) is substantially tangent to the circumference at the radial location from the axis A2 where the hole 158a opens. For instance, a tangential slope is in either a clockwise or counter-clockwise direction with respect to the axis A2 (looking aft). The term "radial slope" (or variations thereof) refers to an orientation that has a radial angle component with respect to the axis A2. For instance, a radial slope is either in a radially inwardly or outwardly direction with respect to the axis A2 (looking aft).

Figure 6:
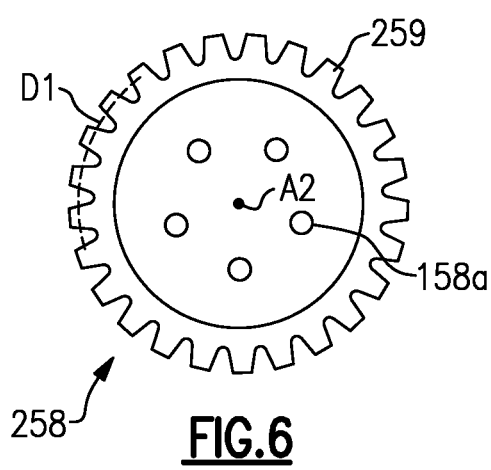
FIG. 6 illustrates another example disc that has a finely serrated outer edge and multiple hydrogen bleed holes

FIG. 6 illustrates another example disc 258. The disc 258 is the same as the disc 158 except that rather than being circular, the disc 258 has a serrated outer edge 259. In this example, the disc 259 is finely serrated but in another example in FIG. 7, the disc 358 has a serrated outer edge 359 that is coarsely serrated. For example, the finely serrated outer edge 259 has more than 12 teeth around the circumference, and the coarsely serrated outer edge 359 has less than 12 teeth around the circumference. For the discs 258 and 358, the diameter D1 is the mean diameter of the serrated edge 259/359, i.e., the mean of the maximum diameter at the tip of the serration and the minimum diameter at the valley between serrations. The serrated outer edges and inner edges 259/359 facilitate mixing of the hydrogen and air. Hence, the outer diameter, inner diameter and the number of serrated teeth are parameters for optimization to achieve maximum mixing and flame stability.

Figure 7:
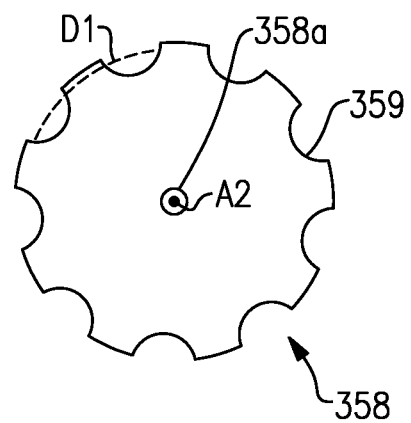
FIG. 7 illustrates another example disc that has a coarsely serrated outer edge and a single hydrogen bleed hole.

As also shown in FIG. 7, the disc 358 includes a single hydrogen bleed hole 358a that is co-axial with the axis A2. The hydrogen bleed hole 358a serves the same purpose as the hydrogen bleed holes 158a discussed above. In this regard, in further examples of any of the foregoing examples, a hydrogen bleed hole 358a may be used instead of, or in addition to, the hydrogen bleed holes 158a. This disclosure may be further understood in view of the following examples. An injector 38 for a gas turbine engine 20 according to an example of the present disclosure includes an annular gas nozzle 42 that is disposed along a central nozzle axis A2 and includes a forward face 44, a frustoconical interior surface 46, and gas feed conduits 48 that open at the frustoconical interior surface 46. A hydrogen feed conduit 50 extends along the central nozzle axis A2 through the annular gas nozzle 42. The hydrogen feed conduit 50 and the frustoconical interior surface 46 define there between an annular mixing chamber 52. The hydrogen feed conduit 50 has an end portion 54 that is axially displaced from the forward face 44. The end portion 54 includes feed holes 56 that open into the mixing chamber 52. A disc 58 is disposed on the end portion 54 of the hydrogen feed conduit 50 and is diametrically larger than the end portion 54 of the hydrogen feed conduit 50.

In a further example of the foregoing example, the disc 58 is diametrically larger than the end portion 54 by a factor of 1.2 to 2.5.

In a further example of any of the foregoing examples, the annular gas nozzle 42 is diametrically larger than the disc 58 by a factor of 2.0 to 4.

In a further example of any of the foregoing examples, the gas feed conduits 48 are obliquely sloped with respect to the central nozzle axis A2.

In a further example of any of the foregoing examples, the gas feed conduits 48 are pointed at the hydrogen feed conduit 50 axially aft of the feed holes 56.

In a further example of any of the foregoing examples, the disc 58 has a serrated outer edge 159/259/359.

In a further example of any of the foregoing examples, the disc 58 has at least one hydrogen bleed hole 158a.

In a further example of any of the foregoing examples, the disc 58 forms a forward boundary of the annular mixing chamber 52.

A gas turbine engine 20 according to an example of the present disclosure includes a combustor section 26 that has a combustion chamber 40, a hydrogen source 32, and an injector 38 as in any of the foregoing examples.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An injector for a gas turbine engine comprising:
   an annular gas nozzle disposed along a central nozzle axis and including a forward face, a frustoconical interior surface, and gas feed conduits opening at the frustoconical interior surface;
   a hydrogen feed conduit extending along the central nozzle axis through the annular gas nozzle, the hydrogen feed conduit and the frustoconical interior surface defining there between an annular mixing chamber, the hydrogen feed conduit having an end portion axially displaced from the forward face, the end portion including feed holes opening into the mixing chamber; and
   a disc disposed on the end portion of the hydrogen feed conduit, the disc being diametrically larger than the end portion of the hydrogen feed conduit.

2. The injector as recited in claim 1, wherein the disc is diametrically larger than the end portion by a factor of 1.2 to 2.5.

3. The injector as recited in claim 2, wherein the annular gas nozzle is diametrically larger than the disc by a factor of 2.0 to 4.

4. The injector as recited in claim 1, wherein the gas feed conduits are obliquely sloped with respect to the central nozzle axis.

5. The injector as recited in claim 1, wherein the gas feed conduits are pointed at the hydrogen feed conduit axially aft of the feed holes.

6. The injector as recited in claim 1, wherein the disc has a serrated outer edge.

7. The injector as recited in claim 1, wherein the disc has at least one hydrogen bleed hole.

8. The injector as recited in claim 1, wherein the disc forms a forward boundary of the annular mixing chamber.

9. A gas turbine engine comprising:
   a combustor section having a combustion chamber;
   hydrogen source; and
   an injector for introducing hydrogen from the hydrogen source and gas into the combustion chamber, the injector including
      an annular gas nozzle disposed along a central nozzle axis and including a forward face, a frustoconical interior surface, and gas feed conduits opening at the frustoconical interior surface,
      a hydrogen feed conduit extending along the central nozzle axis through the annular gas nozzle, the hydrogen feed conduit and the frustoconical interior surface defining there between an annular mixing chamber, the hydrogen feed conduit having an end portion axially displaced from the forward face, the end portion including feed holes opening into the mixing chamber, and
      a disc disposed on the end portion of the hydrogen feed conduit, the disc being diametrically larger than the end portion of the hydrogen feed conduit.

10. The gas turbine engine as recited in claim 9, wherein the disc is diametrically larger than the end portion by a factor of 1.2 to 2.5.

11. The gas turbine engine as recited in claim 10, wherein the annular gas nozzle is diametrically larger than the disc by a factor of 2.0 to 4.

12. The gas turbine engine as recited in claim 9, wherein the gas feed conduits are obliquely sloped with respect to the central nozzle axis.

13. The gas turbine engine as recited in claim 9, wherein the gas feed conduits are pointed at the hydrogen feed conduit axially aft of the feed holes.

14. The gas turbine engine as recited in claim 9, including a compressor section providing gas to the combustor section, a turbine section in fluid communication with the combustor section, and a fan coupled to be driven by the turbine section.

15. The gas turbine engine as recited in claim 9, wherein the disc has a serrated outer edge.

16. The gas turbine engine as recited in claim 9, wherein the disc has at least one hydrogen bleed hole.

* * * * *